United States Patent [19]

Crowder

[11] 4,405,930
[45] Sep. 20, 1983

[54] SYSTEM FOR MAPPING A PHYSICAL VARIABLE

[76] Inventor: James P. Crowder, 3834 E. Mercer Way, Mercer Island, Wash. 98040

[21] Appl. No.: 201,019

[22] Filed: Oct. 27, 1980

[51] Int. Cl.$^3$ .......................... G01D 9/42; G01D 9/00
[52] U.S. Cl. ............................ 346/107 R; 346/33 TP
[58] Field of Search ......... 346/33 TP, 33 ME, 107 R; 250/368

[56] References Cited

U.S. PATENT DOCUMENTS 3,678,277  7/1972  Greenspan et al. ................. 250/368

Primary Examiner—George H. Miller, Jr.

Attorney, Agent, or Firm—Seed, Berry, Vernon & Baynham

[57] ABSTRACT

A system for photographically displaying the magnitude of a physical variable. In one embodiment, a sensor mounted on a movable probe produces an electrical signal indicative of the physical variable. The electrical signal then drives a lamp which is also mounted on the movable probe. A photographic time exposure of the lamp made while the probe scans an area provides a two-dimensional map of the physical variable. In another embodiment, a position transducer measures probe movement to provide an output indicative of the position of the sensor. The transducer output drives a positioning mechanism on which the lamp is mounted so that movement of the lamp corresponds to the movement of the sensor.

13 Claims, 4 Drawing Figures

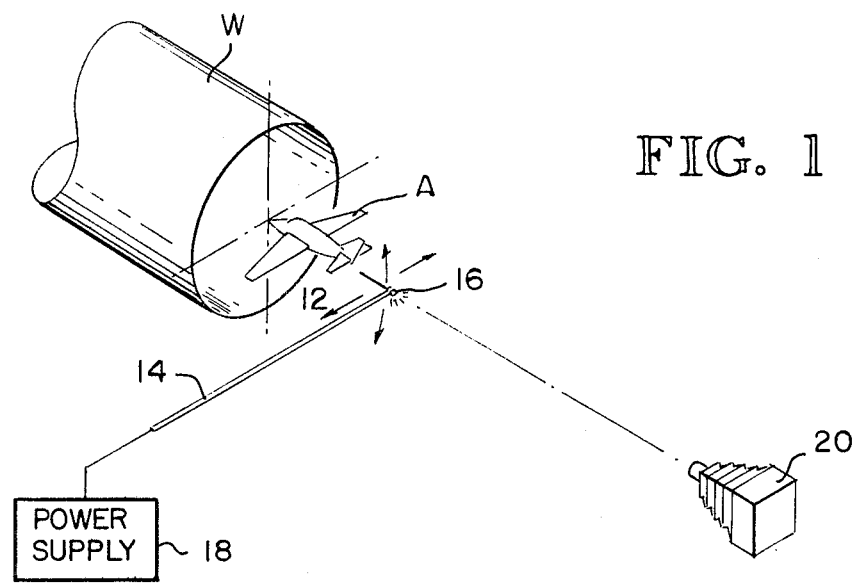
FIG. 1
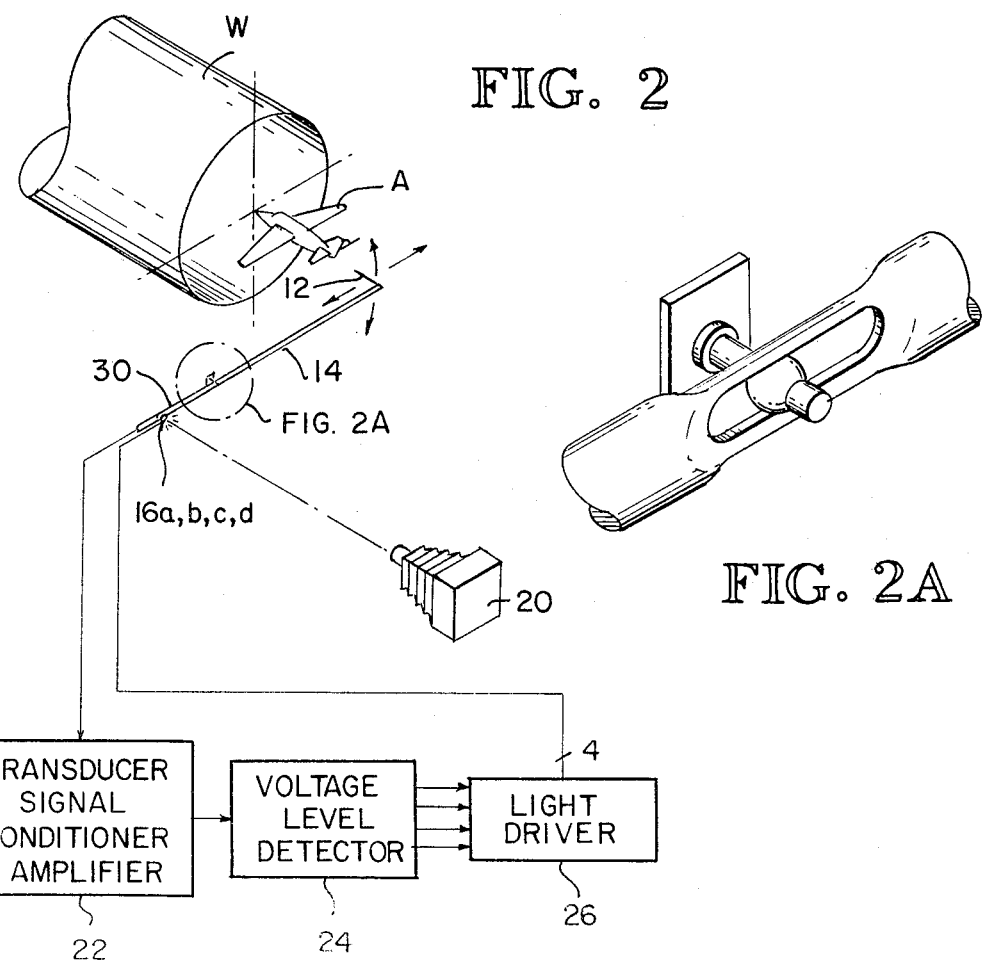
FIG. 2
FIG. 2A

SYSTEM FOR MAPPING A PHYSICAL VARIABLE

BACKGROUND OF THE INVENTION

1. Field of the Invention

This invention relates to sensing devices and, more particularly, to a system for displaying in two dimensions a map of a physical variable which varies in space.

2. Description of the Prior Art

In scientific investigations it is often desirable to measure a physical variable, such as pressure, temperature, solidity, etc., over an area in space. The usual technique for obtaining a map of the physical variable involves scanning the area to be measured with an appropriate sensor while the position of the sensor is measured. A large number of measurements or samples of the sensor output are then recorded along with the corresponding position information. For example, in wind tunnel tests it is highly desirable to measure pressure in a plane perpendicular to the wind axis adjacent or downstream from the object under test.

Regardless of the nature of the physical variable measured in accordance with the above-described technique, the result of the measurement is a large table of numbers which, in their raw form, are generally meaningless. In order to obtain useful information from the samples, it is necessary to extensively analyze the samples, generally with a digital computer. The computer can then be used to generate a meaningful presentation of the samples. The primary disadvantages of this technique are twofold. First, analysis of the samples requires relatively expensive data processing equipment to analyze the samples using elaborate interpolation procedures. Second, the extensive nature of the computer analysis requires a great deal of time so that there is a substantial delay in obtaining the map after the measurements have been completed.

An additional problem with the above-described technique results from the difficulty in obtaining accurate position measurements. The sensor is generally mounted at the end of an elongated sensing probe, and the position of the sensor is measured by measuring the movement of the probe at a substantial distance from the sensor. The sensor is often subjected to substantial forces transverse to the longitudinal axis of the probe, causing the probe to bend significantly. As a result, the measured position of the sensor does not correspond to the actual position of the sensor. These measurement errors can be quite detrimental to achieving a high spatial resolution in the map.

In another context, light-emitting devices have heretofore been used in various systems to measure the position of objects. For example, U.S. Pat. No. 1,568,544, issued to Chilton et al., discloses a torsion-sensing device mounted on a crankshaft. The device includes a light, the radial position of which is proportional to the torsion of the crankshaft. The path of the light as the crankshaft rotates is examined to provide an indication of the crankshaft torsion through the full 360 degrees of rotation. It should be understood that the illumination from the lamp is constant, the magnitude of the torque being indicated by the radial position of the lamp and not its intensity.

U.S. Pat. No. Re. 28,661, issued to Tredway, Sr., discloses a lamp mounted on a golf glove for displaying a pattern on a wall in front of the golfer as the golfer swings. The characteristics of the pattern identify various chracteristics of the golfer's swing.

U.S. Pat. No. 2,813,421, issued to Cheney et al., discloses a system for plotting the pressure along the length of the wind tunnel. In the Cheney et al. device, a pressure-sensing probe is mounted on a carriage which moves along the wind tunnel. The output of the sensor drives one axis of the plotter, while a transducer measuring the position of the sensor drives the other axis of the plotter. The Cheney et al. device does not utilize any light-emitting device.

U.S. Pat. No. 3,197,675, issued to Fruengel et al., discloses a system for performing high-speed photography of gas flow phenomena. Basically, this system utilizes a spark gap to generate a plasma which is carried in a stream of flowing gas. The plasma is photographed as it flows around objects in a gas stream in order to record the flow characteristics.

SUMMARY OF THE INVENTION

It is an object of the invention to provide a mapping system which operates in real time so that the map is completed as soon as the measurements are made.

It is another object of the invention to provide a system for mapping a physical variable which utilizes relatively inexpensive and simple components.

It is another object of the invention to produce a map of a physical variable in which it is unnecessary to precisely control the measurement scan pattern.

It is still another object of the invention to generate a map of a physical variable from a large number of measurements without the necessity of expensive and time-consuming processing of the measurements.

It is a further object of the invention to provide a mapping system which does not require highly accurate position-sensing devices.

These and other objects of the invention are provided by an appropriate sensor mounted on a movable probe which scans the area to be measured. The sensor generates an output indicative of the physical variable. The output is applied to a light-emitting device which generates illumination having a characteristic which varies in response to the output of the sensor. The light-emitting device moves in synchronism with the sensing means so that the characteristic of the illumination at each point is indicative of the physical variable at the corresponding point in the area to be measured. A recording, such as a photographic time exposure, records the illumination from the light-emitting device during scanning to produce a permanent map of the physical variable. A variety of structures may be used to insure that the light-emitting device moves in synchronism with the sensor. For example, the light-emitting device may be mounted with the sensor on the movable probe or it may be mounted on a separate support which is connected to the movable probe through a mechanical linkage. A position transducer may also be provided for measuring movement of the probe. The transducer output then drives a positioning mechanism on which the light-sensing device is mounted so that movement of the light-emitting device corresponds to movement of the sensor. The characteristic of the illumination from the light-emitting device indicative of the physical variable may also vary. For example, the illumination may vary either in color or in intensity as the physical variable varies. Additionally, the illumination may vary through a plurality of discrete values, each corresponding to a predetermined range of the physical variable. The illumination from the light-emitting device, as the sensor scans the measurement area, may be recorded by a photographic time exposure, although any device which is capable of retaining the illumination characteristic as a function of position may also be used. Insofar as the illumination characteristic is recorded in real time as the sensor scans the measurement area, the map of the physical variable is completed when the scan is completed without the need of expensive and time-consuming processing of the measurement data.

BRIEF DESCRIPTION OF THE DRAWINGS

FIG. 1 is a schematic of one embodiment of the invention utilized in a wind tunnel to map the pressure in a plane perpendicular to the wind axis behind an airplane.

FIG. 2 is a schematic of another embodiment of the invention used in a wind tunnel in the same manner as the embodiment of FIG. 1.

FIG. 2A is a detailed isometric view of the indicated portion of FIG. 2.

DETAILED DESCRIPTION OF THE INVENTION

Figure 3:
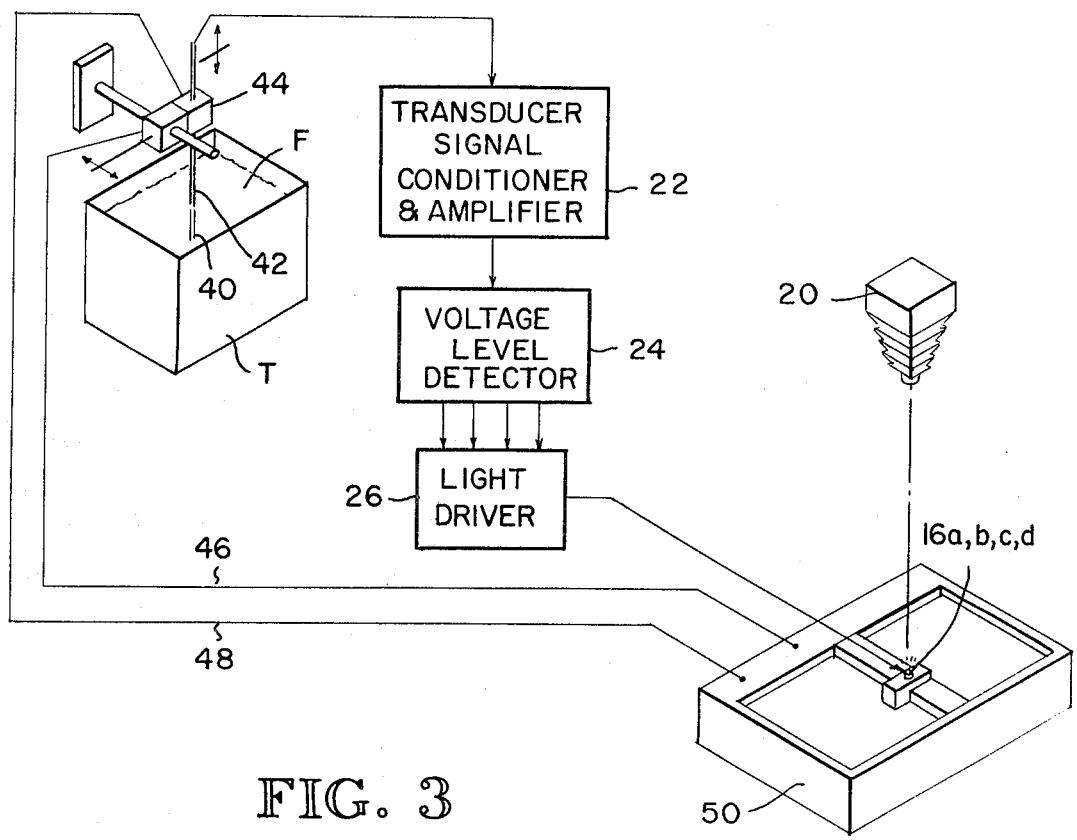
FIG. 3 is a schematic of another embodiment of the invention utilizing a remotely positioned, light-emitting device.

The invention, in its simplest form, is illustrated in FIG. 1 for use in mapping the pressure in a plane behind an airplane A in a wind tunnel W. The wind tunnel W is basically a tubular conduit having a stream of air flowing therethrough. The object under test, such as the airplane A, is placed in a wind stream from the tunnel W to similate actual flight of the airplane A.

The mapping system includes a conventional pressure sensor 12 mounted at the end of an elongated probe 14. A conventional light 16 is also mounted at the end of the probe 14. The lamp 16 faces away from the airplane A so that it is clearly visible behind the airplane A. A power supply 18 supplies electrical power of appropriate voltage to the light 16 and sensor 12.

A variety of signal-processing circuits may receive the output of the sensor 12 in order to drive the light 16. In its simplest form, however, the pressure sensor 12 has a resistance which varies in proportion to the measured pressure. The sensor 12 and light 16 may then be positioned in series with the power supply 18 so that the intensity of the illumination from the lamp 16 is directly proportional to the pressure at the sensor 12.

A map of the pressure in a plane perpendicular to the wind axis is made in accordance with FIG. 1 by systematically scanning the sensor 12 behind the airplane A. A conventional camera 20, having a shutter open during the entire scanning process, records the illumination from the lamp 16 during the scanning process. The intensity of the image on the film in the camera 20 at each point in the image is thus proportional to the pressure at that point. This, of course, assumes that the sensor 12 has been scanning at a constant velocity since the intensity of the image on the film is also proportional to the duration of the exposure at each point on the film. Scanning at a constant velocity is not often easy so that characteristics of the illumination from the lamp 16 other than illumination intensity are more advantageously used.

One illumination chracteristic of a lamp 16 which does not vary with the scanning speed is color. As illustrated in FIG. 2, the output of the sensor 12 is applied to a conventional amplifier 22 which increases the voltage of the signal from the sensor 12 and provides a low-impedance output which is applied to a conventional voltage-level detector 24. The voltage-level detector 24 has four outputs to which a signal is sequentially applied as the amplitude of the input to the detector 24 increases. The four outputs are applied to respective conventional light-driver circuits 26, each of which supplies power to respective lamps 16a,b,c,d of differing color. Thus, relatively low pressures may illuminate one lamp of a first color (blue, for example). As the pressure measured by the sensor 12 continues to increase, the lamps 16b,c,d having other colors (green, yellow, red, respectively) are then sequentially illuminated. This system thus causes the color indicative of the physical variable to vary in discrete stages, each corresponding to a discrete range of pressure measured by the sensor 12. The system could, of course, be operated in a more linear manner by gradually shifting from one voltage-level detector output 24 to the next so that more than one lamp is illuminated as the pressure changes from one pressure range to another.

Although the embodiment of FIG. 1 utilizes a lamp 16 which is mounted with the sensor 12 at the end of the probe 14, it will be understood that the light 16 may be mounted anywhere, as long as it moves in synchronism with the movement of the sensor 12. In the embodiment of FIG. 2, the lamps 16a–d are mounted on a support 30 which is connected to the probe 14 by a mechanical linkage. The linkage, in its simplest form (illustrated in FIG. 2A), is merely an extension 30 of the probe 14 which has an elongated slot 32 formed therein. A stationary pin 34 projects through the slot. Consequently, upward movement of the senaor 12 produces a corresponding downward movement of the lamps 16a–d. Movement of the sensor 12 to the right causes a corresponding movement of the lamps 16a–d to the right. It will now be apparent that the movement of the lamps 16a–d need not be equal to or even a linear function of the movement of the sensor 12. Instead, the movements may be the inverse of each other, as illustrated in FIG. 2 (upward movement of the sensor 12 producing downward movement of the lamps 16a–d), or a transposition may occur in which, for example, movement of the sensor 12 along components of a circular coordinate system produces movement of the lamps 16a,b along respective components of a cartesian coordinate system.

The embodiment illustrated in FIG. 2 is used in the same manner as the embodiment of FIG. 1. The probe 14 and probe extension 30 systematically cause the sensor 12 to scan in a plane behind the object under test. It will be understood, however, that it is unnecessary to precisely control the scanning pattern since the accuracy of the resulting map is not affected by the scanning pattern. However, the scanning pattern does affect the resolution of the resulting map, and the scanning pattern can be adjusted to vary the resolution from area to area of the map. Areas of the measurement plane in which greater variations of the physical variable are occurring can be scanned with a finer pattern. The system's ability to generate the map in real time thus allows real time adjustments of the scanning pattern to minimize the measurement time without sacrificing resolution where fine resolution is needed.

Although the inventive mapping system is illustrated in FIGS. 1 and 2 for use in mapping the pressure behind an airplane A in a wind tunnel W, it will be understood that the technique is equally applicable to mapping any physical variable. For example, as illustrated in FIG. 3, the system may be used to map the temperature of a fluid F in a tank T in a transverse vertical plane. The system includes a conventional temperature sensor 40 mounted on the bottom end of an elongated vertical probe 42 extending downwardly from a conventional traversing mechanism 44. As is well known in the art, the traversing mechanism 44 produces vertical and horizontal position signals on lines 46,48, respectively, which are proportional to the vertical and horizontal position of the sensor 40.

The vertical and horizontal position signals on lines 46,48 are applied to the respective X and Y terminals of a conventional X-Y plotter 50. Signal lamps 16a,b,c,d are mounted on a movable pen support 52 which, as well known in the art, moves in X and Y directions in proportion to the amplitude of the signals applied to its X and Y inputs. The lamps 16a–d are driven by the same amplifier 22, voltage-level detector 24, and light drivers 26 of FIG. 2 so that the color of the illumination from the lamps 16a–d is indicative of the range of temperature measured by the sensor 40. The camera 20 thus produces images on film which have a color at each location on the film corresponding to the temperature of the fluid F at a corresponding position in the transverse, vertical measurement plane.

Although a conventional camera 20 operating in a time-exposure mode is illustrated herein as being the illumination recording device, it will be understood that other conventional devices may also be used for making a record of a characteristic of the illumination from the lamp 16 as a function of the position of the lamp. In fact, the recording device may be a conventional stereographic camera for recording a map of the physical variable in three dimensions, although only two-dimensional maps are illustrated herein. Similarly, although only three devices are shown for moving the lamp 16 in accordance with the movement of the sensor 12, it will be understood that any system for synchronizing the movement of the lamp 16 to the movement of the sensor 12 may be used.

I claim:

1. A system for mapping a physical variable, comprising:
    a movable, elongated probe supported at a support location for scanning movement;
    sensing means mounted on said probe at a location spaced apart from said support location for generating an output indicative of said physical variable;
    light-emitting means mounted on said probe closely adjacent said sensing means so that said sensing means and light-emitting means move with each other despite any deflection of said probe, said light-emitting means receiving the output of said sensing means for generating illumination having a characteristic which varies in response to said output; and
    photographic recording means receiving light from said light-emitting means for recording a characteristic of said light-emitting means as said movable probe causes said sensing means and said light-emitting means to scan over an area to be measured.

2. The system of claim 1 wherein said photographic recording means receives and records light and images from a field of view that includes both a test object affecting said physical variable and said light-emitting means while scanning adjacent said test object so that the map of said physical variable is inherently correlated with the location of said test object.

3. The system of claim 1 wherein the characteristic of said light-emitting means which varies responsive to the output of said sensing means is the intensity of the illumination from said light-emitting means.

4. The system of claim 1 wherein said photographic recording means is a photographic camera operating in a time-exposure mode as said sensing means and said light-emitting means move during scanning.

5. The system of claim 1, further including scanning means supporting said probe at a location spaced apart from said sensing means and said light-emitting means, said scanning means causing pivotal and radial movement of said probe.

6. The system of claim 1 wherein the characteristic of said light-emitting means which varies responsive to the output of said sensing means is the color of illumination from said light-emitting means.

7. The system of claim 6, further including signal-processing means receiving the output of said sensing means and generating respective outputs on a plurality of output lines as the output of said sensing means reaches preset levels each corresponding to one of said output lines, and wherein said light-emitting means include a plurality of discrete, different color light-emitting devices, each connected to one of said output lines so that the color of illumination from said light-emitting means identifies the range of said physical variable measured by said sensing means.

8. A method of producing a map of a physical variable, comprising mounting on an elongated probe closely adjacent each other a sensor for measuring a physical variable and a light-emitting device producing illumination having a characteristic that varies responsive to the output of said sensor, and supporting said probe at a location spaced apart from said sensor and light-emitting device while scanning said sensor over an area to be measured in accordance with the rate at which the characteristic of illumination from said light-emitting means varies in order to minimize the scanning time of said sensor without sacrificing resolution of the resulting map so that the characteristic of illumination from said light-sensing device at a given position is indicative of said physical variable at that position despite any deflection of said probe.

9. The method of claim 8, further including the step of photographically recording the characteristic of the illumination from said light-emitting device as said sensor and light-emitting device are scanned.

10. The method of claim 8 wherein a characteristic of illumination from said light-emitting means varies in discrete steps as said physical variable varies in corresponding ranges.

11. The method of claim 8 whereing said probe is scanned by pivotal and radial movement of said probe.

12. The method of claim 8 wherein said characteristic is recorded by making a photographic time exposure of said light-emitting device as said sensor scans said area to be measured.

13. The method of claim 12 wherein said photographic time exposure is made with a photographic camera, and wherein said method further includes the step of focusing said camera on said light-emitting device during scanning and on a test object affecting said physical variable in the area being scanned so that said map of said physical variable is inherently correlated with the location of said test object.

* * * * *